(12) United States Patent
Decato et al.

(10) Patent No.: US 10,662,337 B2
(45) Date of Patent: May 26, 2020

(54) TRAFFIC PAINT FORMULATION

(71) Applicant: Rohm and Haas Company, Collegeville, PA (US)

(72) Inventors: Sarah E. Decato, Collegeville, PA (US); Joy A. Gallagher, Eagleville, PA (US); Eric C. Greyson, Blue Bell, PA (US); Zhenwen Fu, Norristown, PA (US)

(73) Assignee: Rohm and Haas Company, Collegeville, PA (US)

( * ) Notice: Subject to any disclaimer, the term of this patent is extended or adjusted under 35 U.S.C. 154(b) by 142 days.

(21) Appl. No.: 16/133,974

(22) Filed: Sep. 18, 2018

(65) Prior Publication Data

US 2019/0106577 A1    Apr. 11, 2019

Related U.S. Application Data

(60) Provisional application No. 62/568,370, filed on Oct. 5, 2017.

(51) Int. Cl.
| | |
|---|---|
| *C09D 5/00* | (2006.01) |
| *C09D 5/33* | (2006.01) |
| *C09D 125/14* | (2006.01) |
| *C09D 7/61* | (2018.01) |
| *C09D 7/20* | (2018.01) |
| *C09D 7/65* | (2018.01) |
| *C09D 133/08* | (2006.01) |
| *C09D 5/02* | (2006.01) |
| *C09D 163/00* | (2006.01) |

(52) U.S. Cl.
CPC ............. *C09D 5/004* (2013.01); *C09D 5/022* (2013.01); *C09D 7/20* (2018.01); *C09D 7/61* (2018.01); *C09D 7/65* (2018.01); *C09D 125/14* (2013.01); *C09D 133/08* (2013.01); *C09D 163/00* (2013.01)

(58) Field of Classification Search
CPC .......... C09D 5/004; C09D 5/022; C09D 7/20; C09D 7/61; C09D 7/65; C09D 125/14; C09D 133/08
See application file for complete search history.

(56) References Cited

U.S. PATENT DOCUMENTS

| | | |
|---|---|---|
| 5,527,853 A | 6/1996 | Landy et al. |
| 5,939,514 A | 8/1999 | Brown et al. |
| 7,951,869 B2 | 5/2011 | Funston |
| 8,658,742 B2 | 2/2014 | Dombrowski et al. |

FOREIGN PATENT DOCUMENTS

| | | |
|---|---|---|
| EP | 933384 | 8/1999 |
| EP | 2495281 A1 | 9/2012 |
| JP | 11100552 | 4/1999 |
| WO | 2017035832 A1 | 3/2017 |
| WO | 2018081943 A1 | 5/2018 |

*Primary Examiner* — Edward J Cain
(74) *Attorney, Agent, or Firm* — Reid S. Willis

(57) ABSTRACT

The present invention relates to a coating composition comprising an aqueous dispersion of a) carboxylate salt functionalized first thermoplastic polymer particles; b) second thermoplastic polymer particles imbibed with a thermosettable compound and functionalized with anti-agglomerating groups; c) an extender; and d) a volatile base. The composition of the present invention is suitable as a waterborne quick-set formulation useful as a traffic paint.

8 Claims, No Drawings

TRAFFIC PAINT FORMULATION

BACKGROUND OF THE INVENTION

The present invention relates to an aqueous dispersion of polymer particles and thermosettable resin imbibed polymer particles suitable for use as a traffic paint.

Waterborne traffic coating compositions offer a low cost environmentally friendly way of improving roadway safety and communication to drivers, cyclists and pedestrians. U.S. Pat. No. 5,527,853 discloses a shelf stable quick-setting waterborne formulation suitable for traffic paint comprising an acrylic latex, a polyamine, and a volatile base. The formulation is disclosed as being storage stable, even at advanced temperatures.

U.S. Pat. No. 5,939,514 discloses a waterborne latex formulation comprising a) an acid stabilized binder blended with a polyamine or functionalized with amine groups; b) a crosslinking component; and c) a volatile base. This formulation is reported to give a coating with improved wear resistance as compared with formulations that do not contain a polyamine and a crosslinking component. Nevertheless, the formulation requires relatively high concentrations of an expensive crosslinker (for example >20% epoxy resin based on latex solids), which reduces the window of time available to the formulator to apply the coating to the substrate once the binder/polyamine/volatile base is blended with the crosslinker (pot life).

Accordingly, there is a need in the art to find a cost effective, quick setting waterborne formulation with improved pot life that forms a durable pavement marking.

SUMMARY OF THE INVENTION

The present invention addresses a need in the art by providing a coating composition comprising an aqueous dispersion of a) from 5 to 30 weight percent of carboxylate salt functionalized first thermoplastic polymer particles having a $T_g$ in the range of −20° C. to 70° C.; b) from 1 to 35 weight percent of second thermoplastic polymer particles that are i) imbibed with a thermosettable compound having at least two oxirane groups and ii) functionalized with a sufficient concentration of anti-agglomerating groups to stabilize the second thermoplastic polymer particles against agglomeration; c) from 30 to 80 weight percent of an extender; and d) a volatile base; wherein all weight percentages are based on the weight of total solids. The composition of the present invention addresses a need in the art by providing a quick-setting, durable, long pot life formulation that is suitable for pavement marking.

DETAILED DESCRIPTION OF THE INVENTION

The present invention is a coating composition comprising an aqueous dispersion of a) from 5 to 30 weight percent of carboxylate salt functionalized first thermoplastic polymer particles having a $T_g$ in the range of −20° C. to 70° C.; b) from 1 to 35 weight percent of second thermoplastic polymer particles that are i) imbibed with a thermosettable compound having at least two oxirane groups and ii) functionalized with a sufficient concentration of anti-agglomerating groups to stabilize the second thermoplastic polymer particles against agglomeration; c) from 30 to 80 weight percent of an extender; and d) a volatile base.

Aqueous dispersions of the first and second thermoplastic polymer particles (thermoplastic latexes) can be achieved through free radical emulsion or suspension addition polymerization or by dispersion of a pre-formed polymer under shear into an aqueous medium. Examples of suitable thermoplastic latexes include acrylic, styrene-acrylic, styrene-butadiene, urethane, ester, olefin, vinyl chloride, ethylene vinyl acetate, and polyvinyl acetate based latexes, with acrylic and styrene-acrylic latexes being preferred. The aqueous dispersions of the first and second thermoplastic polymers are advantageously prepared separately, then combined to form the composition of the present invention.

The carboxylate salt functionalized first thermoplastic polymer particles, which by definition are not imbibed with a thermosettable compound, comprise structural units of a salt of a carboxylic acid monomer, preferably in the range of from 1 to 5 weight percent, based on the weight of the first thermoplastic polymer particles. Examples of suitable carboxylic acid monomers—which are precursors to the carboxylate salts—include acrylic acid, methacrylic acid, maleic acid, fumaric acid, and itaconic acid. Most preferably, the first thermoplastic polymer particles are functionalized with structural units of the ammonium salt of the carboxylic acid monomer.

As used herein, the term "structural unit" of a particular monomer refers to the remnant of the monomer after polymerization. For example, a structural unit of the ammonium salt of methacrylic acid is illustrated as follows:

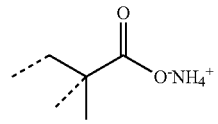

Structural Unit of Ammonium Salt of Methacrylic Acid where the dotted lines represent the points of attachment to the polymer backbone.

The first thermoplastic polymer particles preferably comprise structural units of methyl methacrylate or styrene or a combination thereof, and structural units of butyl methacrylate, ethyl acrylate, butyl acrylate, or 2-ethylhexyl acrylate, or a combination thereof. The concentration of first thermoplastic polymer particles is preferably from 10 to 25 weight percent, based on the weight of total solids in the composition. The first thermoplastic polymer particles preferably have a $T_g$, as calculated by the Fox equation, in the range of from −10° C. to 30° C.

The second thermoplastic polymer particles, which preferably have a $T_g$, as calculated by the Fox equation, in the range of from −20° C., preferably from 0° C. to 70° C., more preferably to 50° C., are functionalized with anti-agglomerating groups, which refer to hydrophilic groups that are sufficiently unreactive with the oxirane groups (and ester groups, if present) such that the latex particles are heat-age stable at 60° C. for 10 days. The term "heat-age stable at 60° C. for 10 days" is used herein to mean that the particle size of a latex subjected to heat-aging at 60° C. for 10 days stability does not increase by more than 30% beyond the particle size before such heat-age studies.

Anti-agglomerating functional groups can be incorporated into the second thermoplastic polymer particles using monomers containing anti-agglomerating functional groups (anti-agglomerating monomers), although it would also be possible to incorporate such groups by grafting. The anti-agglomerating groups are believed to be effective because they are hydrophilic as well as non-reactive with oxirane groups under heat-age conditions. The general class of such groups includes amide groups, acetoacetoxy groups, and strong protic acids, which are pH adjusted to form their conjugate bases.

Examples of anti-agglomerating monomers include acrylamide, ethylenically unsaturated polyalkylene oxide phosphate esters, phosphate ester monomers such as phosphoethyl methacrylate (PEM), alkali metal styrene sulfonates such as sodium styrene sulfonate, diketoalkyl acrylates and methacrylates such as acetoacetoxyethyl methacrylate, and acrylamidoalkyl sulfonates such as 2-acrylamido-2-methylpropane sulfonate.

Although carboxylic acid containing monomers are not anti-agglomerating, carboxylic acid groups can be incorporated into the polymer particles provided the polymer contains a sufficient concentration of anti-agglomerating groups and the pH is sufficiently high to maintain latex stability under heat-age conditions.

Preferably, the second thermoplastic polymer particles further comprise structural units of methyl methacrylate or styrene or a combination thereof, and structural units of butyl methacrylate, ethyl acrylate, butyl acrylate, or 2-ethylhexyl acrylate, or a combination thereof.

Although not bound by theory, it is believed that anti-agglomerating groups are effective in stabilizing the polymer because the groups are both hydrophilic and non-reactive toward epoxy groups under heat-age conditions. Where the anti-agglomerating groups arise from monomers containing strong acid functionality (for example, phosphoethyl methacrylate, sodium styrene sulfonate, and 2-acrylamido-2-methylpropane sulfonate), it has been discovered that colloidal and heat-age stability is achieved by adjusting the pH of the latex to a level above the first $pK_a$ of a polyprotic acid (such as phosphoethyl methacrylate) or above the $pK_a$ of a monoprotic acid (such as sodium styrene sulfonate, and 2-acrylamido-2-methylpropane sulfonate). If the pH is too low, acid catalyzed oxirane ring opening can occur—at higher pH, such a mechanism is not available and the conjugate base is non-nucleophilic under heat-age conditions.

The concentration of anti-agglomerating functional groups in the second thermoplastic polymer particles is sufficient to stabilize the polymer particles under heat-age conditions; preferably the concentration of anti-agglomerating groups is from 0.5, and more preferably from 1, to preferably 10, and more preferably to 5 weight percent, based on the weight of the second thermoplastic polymer particles. Preferably, the concentration of carboxylic acid groups is less than 5, more preferably less than 2, and most preferably less than 1 weight percent, based on the weight of the second thermoplastic polymer particles.

The second thermoplastic polymer particles are imbibed with a thermosettable compound having oxirane groups; preferably, the thermosettable compound is a Novolac resin, a di-, tri- or tetraglycidyl ether or a di-, or tri- or tetraglycidyl ester compound. Diglycidyl ethers are preferred thermosettable compounds.

Examples of suitable thermosettable compounds include the diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedmethanol diglycidyl ether, 1,3-cyclohexanedmethanol diglycidyl ether, the diglycidyl ester of hexahydrophthalic acid, and novolac resins, and combinations thereof. A commercially available thermosettable compound is D.E.R. 331 Liquid Epoxy Resin.

Imbibing is evidenced by 1) a marked partitioning of emulsified droplets of thermosettable compound into the second thermoplastic polymer particles (prior to combining with the dispersion of first thermoplastic polymer particles), as determined by the disappearance of emulsified droplets in the aqueous phase by optical microscopy; and/or 2) and an increase in the diameter of the second thermoplastic polymer particles after admixing the thermosettable compound, preferably as a micronized aqueous dispersion, with the dispersion of the second thermoplastic polymer particles, preferably in the presence of a stabilizing amount of a nonionic surfactant, as disclosed in U.S. Pat. No. 8,658,742.

The concentration of imbibed thermosettable compound is preferably in the range of from 10, more preferably from 20, and most preferably from 25 weight percent, to 60, more preferably to 50, and most preferably to 40 weight percent, based on the weight of the second (unimbibed) polymer particles and the thermosettable compound. The concentration of the imbibed second thermoplastic polymer particles is from 1, preferably from 2, and more preferably from 5, to 35, preferably to 30, more preferably to 20, and most preferably to 10 weight percent, based on the weight of total solids in the composition. Examples of commercially available aqueous dispersions of thermoplastic polymer particles imbibed with a thermosettable compound are MAINCOTE™ AEH-10 and AEH-20 Resins. (A Trademark of The Dow Chemical Company or its Affiliates.)

The composition of the present invention further includes preferably from 40, and more preferably from 50 weight percent, to preferably 70 weight percent of an extender, based on the weight of total solids in the composition. As used herein, the term extender refers to any white, translucent, or semi-transparent inorganic particulate filler that does not impart a significant (non-white) color or hue. Examples of extenders include oxides of zinc and titanium, $BaSO_4$; silicates and aluminosilicates such as talc, clay, mica, and sericite; $CaCO_3$; nepheline; feldspar; wollastonite; kaolinite; dicalcium phosphate; and diatomaceous earth.

The pigment volume concentration of the composition is preferably in the range of from 50, more preferably from 55, and most preferably from 60, to preferably 75, more preferably to 70. As used herein, pigment volume concentration refers to the volume percent of extender based on the volume of solids in the composition.

The composition further includes a volatile base, that is, a base having a boiling point of less than 150° C. The volatile base is used to create a pH drop upon application of the composition to a substrate. Examples of suitable volatile bases include ammonia, dimethylamine, and diethylamine, with ammonia being preferred.

The composition of the present invention preferably further comprises from 0.02, more preferably from 0.05, most preferably from 0.1 weight percent, to 10, more preferably to 5, and most preferably to 3 weight percent, based on the total weight of solids, of a hardening agent such as a primary or secondary amine, a polyamine, an aminosilanol, a silane, or a polyacid.

A polyamine, which refers to a compound containing at least 5 amine groups; examples of polyamines include polyethyleneimines (polyaziridines) and polymers or copolymers of a monoethylenically unsaturated amine comprising from 20, preferably from 50 weight percent, to 100 weight percent structural units of the monoethylenically unsaturated amine, with copolymers of a monoethylenically unsaturated amine being preferred. Classes of monoethylenically unsaturated amines suitable for making polyamine homopolymers and copolymers include alkylaminoalkyl acrylates and methacrylates, acrylamides, methacrylamides, N-acryloxyalkyl-oxazolidines, N-acryloxyalkyltetrahydro-1,3-oxazines, and hydroxyalkylaminoethyl acrylates and methacrylates. Specific examples of suitable monoethylenically unsaturated amines include dimethylaminoethyl acrylate, dimethylaminoethyl methacrylate, N-β-aminoethyl acrylamide, N-β-aminoethyl methacrylamide, N-(monomethylaminoethyl)-acrylamide, N-(monomethylaminoethyl)-methacrylamide, 2-(3-oxazolidinyl)ethyl methacrylate, 2-(3-oxazolidinyl)ethyl acrylate, 3-(γ-methacryloxypropyl)-tetrahydro-1,3-oxazine, 3-(β-methacryloxyethyl-2-methyl-2-propyloxazolidine, 3-(β-methacryloxyethyl)-2,2-pentamethylene oxazolidine, N-2-(2-methacryloxy)ethyl-5-methyl-oxazolidine, N-2-(2-methacryloxy)ethoxy-5-methyl-oxazolidine, N-2-(2-acryloxy)ethyl-5-methyl-oxazolidine, 2-(3-oxazolidinyl)ethyl methacrylate, 2-((2-hydroxyethyl)amino)ethyl methacrylate, 2-((2-hydroxyethyl)amino)ethyl methacrylate, 2-((2-hydroxypropyl)amino)ethyl methacrylate, and 2-((2-hydroxypropyl)amino)ethyl acrylate.

The weight average molecular weight ($M_w$) of the polyamine, measured using size exclusion chromatography (SEC), as described herein, is preferably in the range of from 500, more preferably from 5000, and most preferably from 10,000 amu, to preferably 500,000, more preferably to 100,000, and most preferably to 80,000 amu.

In a preferred process for preparing composition of the present invention, an aqueous dispersion of carboxylic acid or carboxylate functionalized first thermoplastic polymers particles is admixed with a) ammonia; b) a polyamine, preferably poly-2-(3-oxazolidinyl)ethyl methacrylate (poly-OXEMA); and c) an extender, preferably a combination of $TiO_2$ and $CaCO_3$, to form an intermediate traffic paint formulation; this intermediate formulation is then advantageously admixed with an aqueous dispersion of second thermoplastic polymer particles imbibed with thermosettable compound.

The present invention is useful as a 2-component pavement marking (e.g., traffic paint) composition. It has been surprisingly discovered that pot life and durability the composition of the present invention is markedly improved over compositions that do not contain polymer particles imbibed with a thermosettable compound. Moreover, dry-through time is not adversely affected by the combination of the inclusion of a latex imbibed with the thermosettable compound.

EXAMPLES

Determination of $M_w$ of Polyamines $M_w$ of polyamines is measured by hydrolyzing the dry polymer with KOH (1 g/10 mL of ethanol) and adding it to a Teflon cup of a Parr bomb for 3 days at 180° C. The pellet is rinsed with ethanol and air dried in vacuo at 60° C. to 80° C. overnight. An Agilent 1100 isocratic pump liquid chromatography system is used with a polyacrylic acid standard. The reported $M_w$ ignored the presence of the hydrolysis byproduct diethanol amine. Samples are prepared for SEC by dilution into 100 mM ammonium formate (pH 3.7) at a concentration of about 2 mg/g. The samples are shaken for 2 to 3 h at ambient temperature and then filtered through a 0.45-μm polyvinylidene fluoride filter prior to analysis. SEC separations are performed in 100 mM ammonium formate at pH 3.7 at a flow rate of 1 mL/min using an SEC column set composed of TSKgel G6000PWx1-CP, G5000PWx1-CP, and G3000PWx1-CP (Tosoh Bioscience, LLC).

Determination of Dry-Through

To determine dry-through a thumb was placed on the film recurrently and light pressure was exerted with concomitant turning of the thumb at an angle of 90° in the plane of film. The film is considered dry-through when there is no loosening, detachment, wrinkling or evidence of distortion of the film.

Example 1—Preparation of Traffic Paint Formulation Combined with Latex Imbibed with Epoxy Resin Rhodoline Colloid 226/35 dispersant (33.07 g), Surfynol CT-136 surfactant (12.38 g), and Drewplus L-493 defoamer (24.3 g), were added with stirring to a vessel containing FASTRACK XSR Styrene Acrylic Latex (1926 g, 50% solids). Ti-Pure R-900 powder (450 g) and Omyacarb 5 $CaCO_3$ (3408.17 g) were then added as powders to the vessel. Stirring continued for 30 min, after which time methanol (135 g) and Texanol coalescent (116.73 g) were added followed by addition of water (94 g) and Cellosize ER 52M HEC (2% aq., 60.67 g) to form the traffic paint intermediate. MAINCOTE AEH-10 Resin (35.7 g, 52% solids) was added slowly to a portion of the intermediate (375 g) in a vessel and stirred vigorously for 1 min.

Comparative Example 1—Preparation of Traffic Paint Formulation Combined with Water-Dispersed Epoxy Resin Oudrasperse WB 3001 Waterborne Epoxy Resin (8.71 g) was added to the traffic paint intermediate as described in Example 1 (375 g) in a vessel and stirred vigorously for 1 min.

Testing Results

The formulations derived from Example 1 and Comparative Example 1 were evaluated for pot-life stability, road durability, and dry time.

Pot Life Stability

Pot life stability was determined by measuring KU viscosity of closed paint cans at 0, 1 h, 24 h, and 48 h. The control sample did not contain any epoxy resin. The results are shown in Table 1.

TABLE 1

| Pot-Life Stability of Traffic Paint Formulations Krebs Viscosity (KU units) | | | | |
|---|---|---|---|---|
| | 0 h | 1 h | 24 h | 48 h |
| Control | 83 | 82 | 81 | 83 |
| Example 1 | 73 | 73 | 73 | 73 |
| Comp. Example 1 | 77 | 103 | 104 | 103 |

The data show that the traffic paint formulation containing latex imbibed with epoxy resin has significantly greater pot-life stability over the formulation with water dispersed epoxy resin.

Road Durability

The formulations were placed in a walk-behind air atomized line striper and applied at 4-inch line widths and at thicknesses of 20 mils (500 μm) over a well-traveled highway (11,000 average daily traffic) perpendicular to the flow of traffic to accelerate wear in regions where the paint is contacted by vehicles. The coatings were tested for percentage of paint remaining on the road (% Presence) at 21 d, 63 d, and 100 d. Table 2 shows % presence of coating after days of exposure to environment and traffic.

TABLE 2

| | Durability Data % Presence | | | |
|---|---|---|---|---|
| | 0 d | 21 d | 63 d | 100 d |
| Control | 100 | 85 | 75 | 65 |
| Example 1 | 100 | 98 | 90 | 85 |
| Comp. Example 1 | 100 | 70 | 70 | 50 |

Dry Time

The control formulation and the formulation of Example 1 were applied with a draw-down bar to glass panels at a thickness of 20 mil (500 μm) in a temperature/humidity room controlled at 73.5° F. and 50% humidity. The coatings were measured for dry-through to the substrate and it was found that the dry-through time for the example of the present invention was 22 min, versus 15 min for the control. The results show that the dry-through time was not significantly affected by the presence of the imbibed epoxy resin. This finding was surprising because the amount of polyamine in the traffic paint was diluted, without an adverse impact on dry-through.

The invention claimed is:

1. A coating composition comprising an aqueous dispersion of a) from 5 to 30 weight percent of carboxylate salt functionalized first thermoplastic polymer particles having a $T_g$ in the range of −20° C. to 70° C.; b) from 2 to 35 weight percent of second thermoplastic polymer particles that are i) imbibed with a thermosettable compound having at least two oxirane groups and ii) functionalized with a sufficient concentration of anti-agglomerating groups to stabilize the second thermoplastic polymer particles against agglomeration; c) from 30 to 80 weight percent of an extender; and d) a volatile base; wherein all weight percentages are based on the weight of total solids in the composition.

2. The coating composition of claim 1 wherein the carboxylate salt functionalized first thermoplastic polymer particles comprise from 1 to 5 weight percent structural units of a salt of a carboxylic acid monomer, based on the weight of the first thermoplastic polymer particles; wherein the concentration of the first thermoplastic polymer particles is from 10 to 25 weight percent, based on the weight of total solids in the composition.

3. The composition of claim 2 wherein the second thermoplastic polymer particles are functionalized with from 0.5 to 10 weight percent, based on the weight of the second thermoplastic polymer particles, of anti-agglomerating groups, which are structural units of an ethylenically unsaturated polyalkylene oxide phosphate ester, acrylamide, phosphoethyl methacrylate, sodium styrene sulfonate, acetoacetoxyethyl methacrylate, or 2-acrylamido-2-methylpropane sulfonate, wherein the concentration of the second thermoplastic polymer particles is from 2 to 10 weight percent, based on the weight of total solids in the composition.

4. The composition of claim 3 wherein the imbibed thermosettable compound is a diglycidyl ether at a concentration in the range of from 20 to 60 weight percent, based on the weight of the second (unimbibed) polymer particles and the thermosettable compound.

5. The composition of claim 4 wherein the salt of the carboxylic acid monomer is an ammonium salt of methacrylic acid or acrylic acid; and wherein the diglycidyl ether is selected from the group consisting of the diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedmethanol diglycidyl ether, 1,3-cyclohexanedmethanol diglycidyl ether, and the diglycidyl ester of hexahydrophthalic acid; and wherein the diglycidyl ether is present at a concentration in the range of from 25 to 50 weight percent, based on the weight of the second (unimbibed) polymer particles and the thermosettable compound.

6. The composition of claim 5 wherein the composition further comprises from 0.02 to 10 weight percent, based on the total weight of solids, of a hardening agent, which is a primary or secondary amine, a polyamine, an aminosilanol, a silane, or a polyacid; wherein the extender comprises calcium carbonate and titanium dioxide; and wherein the volatile base is ammonia.

7. The composition of claim 6 which comprises from 0.02 to 3 weight percent of the hardening agent, which is selected from the group consisting of an alkylaminoalkyl acrylate, an alkylaminoalkyl methacrylate, an acrylamide, a methacrylamide, an N-acryloxyalkyl-oxazolidine, an N-acryloxyalkyltetrahydro-1,3-oxazine, a hydroxyalkylaminoethyl acrylate, and a hydroxyalkylaminoethyl methacrylate.

8. The composition of claim 6 which has a pigment volume concentration in the range of from 50 to 70, wherein the hardening agent is poly-2-(3-oxazolidinyl)ethyl methacrylate having an $M_w$ in the range of from 10,000 to 100,000 amu.

* * * * *